(12) United States Patent
Baek (10) Patent No.: US 12,354,523 B2
(45) Date of Patent: Jul. 8, 2025

(54) DISPLAY DEVICE AND OPERATING METHOD THEREFOR

(71) Applicant: LG ELECTRONICS INC., Seoul (KR)

(72) Inventor: Seunghun Baek, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/292,669

(22) PCT Filed: Jul. 26, 2021

(86) PCT No.: PCT/KR2021/009646
§ 371 (c)(1),
(2) Date: Jan. 26, 2024

(87) PCT Pub. No.: WO2023/008593
PCT Pub. Date: Feb. 2, 2023

(65) Prior Publication Data
US 2024/0371311 A1    Nov. 7, 2024

(51) Int. Cl.
*G09G 3/20* (2006.01)
*H02M 3/335* (2006.01)

(52) U.S. Cl.
CPC ...... *G09G 3/2096* (2013.01); *H02M 3/33571* (2021.05); *G09G 2330/024* (2013.01); *G09G 2330/026* (2013.01); *G09G 2330/027* (2013.01); *G09G 2354/00* (2013.01)

(58) Field of Classification Search
CPC .......... G09G 3/2096; G09G 2330/024; G09G 2330/026; G09G 2330/027; G09G 2354/00; H02M 3/33571
See application file for complete search history.

(56) References Cited

U.S. PATENT DOCUMENTS 5,262,930 A    11/1993   Hua et al.
2009/0079495 A1    3/2009   Morita
2011/0249195 A1    10/2011  Teranuma
(Continued)

FOREIGN PATENT DOCUMENTS

CN    108141048 A   *   6/2018   .............. H02J 5/005
CN    111883079        11/2020
(Continued)

OTHER PUBLICATIONS

PCT International Application No. PCT/KR2021/009646, International Search Report dated Apr. 21, 2022, 2 pages.
(Continued)

*Primary Examiner* — Towfiq Elahi
(74) *Attorney, Agent, or Firm* — LEE, HONG, DEGERMAN, KANG & WAIMEY (57) ABSTRACT

The present disclosure relates to a display device for alleviating an efficiency reduction problem at a light load, and an operating method therefor, the display device comprising: a display; a power supply unit including a direct current (DC)/DC converter, which converts the level of DC power to supply same to a load; and a control unit for controlling the operating frequency of the DC/DC converter, wherein the control unit can change the resonance frequency of the DC/DC converter according to the load.

9 Claims, 9 Drawing Sheets

(56) References Cited

U.S. PATENT DOCUMENTS

| 2015/0124487 | A1* | 5/2015 | Fu ........................ H02M 3/015 |
| | | | 363/17 |
| 2017/0110063 | A1 | 4/2017 | Arai et al. |
| 2020/0074920 | A1 | 3/2020 | Lee et al. |
| 2020/0412248 | A1 | 12/2020 | Onozaki |
| 2022/0036840 | A1 | 2/2022 | Zhao et al. |

FOREIGN PATENT DOCUMENTS

| EP | 2863531 | 4/2015 | |
| JP | 2016226134 | 12/2016 | |
| KR | 101204566 B1 * | 7/2012 | ............. H02M 1/08 |
| KR | 101204566 | 11/2012 | |
| KR | 1020150078846 | 7/2015 | |
| WO | 2019188029 | 10/2019 | |

OTHER PUBLICATIONS

Korean Intellectual Property Office Application No. 10-2024-7002992, Office Action dated Sep. 23, 2024, 4 pages.
European Patent Office Application Serial No. 21951963.4, Search Report dated May 2, 2025, 10 pages.

* cited by examiner

DISPLAY DEVICE AND OPERATING METHOD THEREFOR

CROSS-REFERENCE TO RELATED APPLICATION(S)

This application is the National Stage filing under 35 U.S.C. 371 of International Application No. PCT/KR2021/009646, filed on Jul. 26, 2021, the contents of which are all incorporated by reference herein in its entirety.

TECHNICAL FIELD

The present disclosure relates to a display device and a method for operating the same. More specifically, the present disclosure relates to a circuit of an LLC resonance converter of a power supply unit provided in a display device, and an operation thereof.

BACKGROUND ART

A display device may include a converter that converts externally supplied AC power to DC power and a DC/DC converter that converts a level of the DC power. In addition, an LLC resonance converter is mainly used as the DC/DC converter, and the LLC resonance converter has an advantage of achieving high efficiency and high power density by performing a zero voltage switching (ZVS) operation in a wide frequency range.

The LLC resonance converter has high efficiency because a gain is adjustable through a frequency control at a heavy load, but rapidly decreases in efficiency because the gain is not adjustable due to the limitation of the frequency operation range at a light load.

As such a method for improving the problem of the low efficiency at the light load, there is a design method such as intermittent switching burst operation or reducing the switching frequency. However, in the case of the burst operation, there is a problem in that audible noise occurs as a wattage increases. In addition, in the case of the design method that reduces the switching frequency, the operation current increases, and thus, there is a problem that power density decreases as a size of a magnetic component increases, and there is a problem that, when changing a half bridge to a full bridge to reduce the operation current, costs increase, and a structure is complicated.

DISCLOSURE OF THE INVENTION

Technical Problem

An object of the present disclosure is to solve the above-mentioned problems.

The present disclosure provides a display device provided with an LLC resonance converter that operates with high efficiency at a light load while minimizing problems of increasing noise, lower power density, increasing cost, and structural complexity, and a method for operating the same.

Technical Solution

In a display device and an operating method thereof according to an embodiment of the present disclosure, a resonance frequency may be changed according to a load.

In a display device and an operating method thereof according to an embodiment of the present disclosure, a resonance frequency may be changed to facilitate gain adjustment through a frequency control at a light load.

In a display device and an operating method thereof according to an embodiment of the present disclosure, the display device may include a display, a power supply unit comprising a DC/DC converter configured to convert a level of DC power so as to supply the converted DC power to a load, and a control unit configured to control an operating frequency of the DC/DC converter, wherein the control unit is configured to change a resonance frequency of the DC/DC converter according to the load.

The control unit may be configured to acquire power consumption of the display device on the basis of information about the load and change the resonance frequency according to the power consumption.

The control unit may be configured to acquire a screen mode of the display on the basis of information about the load and change the resonance frequency according to the screen mode.

The control unit may be configured to acquire set brightness of the display on the basis of information about the load and change the resonance frequency according to the set brightness.

The control unit is configured to change the resonance frequency to a first resonance frequency when the load is a heavy load and change the resonance frequency to a second resonance frequency less than the first resonance frequency when the load is a light load.

The DC/DC converter may include a half bridge circuit, an LLC resonance circuit including a first resonance inductance and a first resonance capacitance, and a rectifier.

The DC/DC converter may further include a sub-resonance inductance and a sub-resonance capacitance, which are selectively connected to the LLC resonance circuit.

The sub-resonance inductance may include a first switch and a second resonance inductance, and the sub-resonance capacitance may include a second switch and a second resonance capacitance.

When the first switch is turned on, the first resonance inductance and the second resonance inductance may be connected to each other, and when the second switch is turned on, the first resonance capacitance and the second resonance capacitance may be connected to each other.

The first resonance inductance and the second resonance inductance may be connected in series, and the first resonance capacitance and the second resonance capacitance may be connected in parallel.

Advantageous Effects

According to the embodiment of the present disclosure, since the gain is adjustable at the light load through the frequency control, there may be the advantage in minimizing the rapid decrease in efficiency at the light load.

According to the embodiment of the present disclosure, there may be the advantage that the problems such as the increasing noise, the lower power density, the increasing cost, and the structural complexity are minimized while operating with the high efficiency at the light load.

According to the embodiment of the present disclosure, since the resonance frequency is changed according to the load, there may be the advantage of being able to operate with the high efficiency for all the loads.

MODE FOR CARRYING OUT THE INVENTION

Hereinafter, embodiments relating to the present disclosure will be described in detail with reference to the accompanying drawings. The suffixes "module" and "unit" for components used in the description below are assigned or mixed in consideration of easiness in writing the specification and do not have distinctive meanings or roles by themselves.

Figure 1:
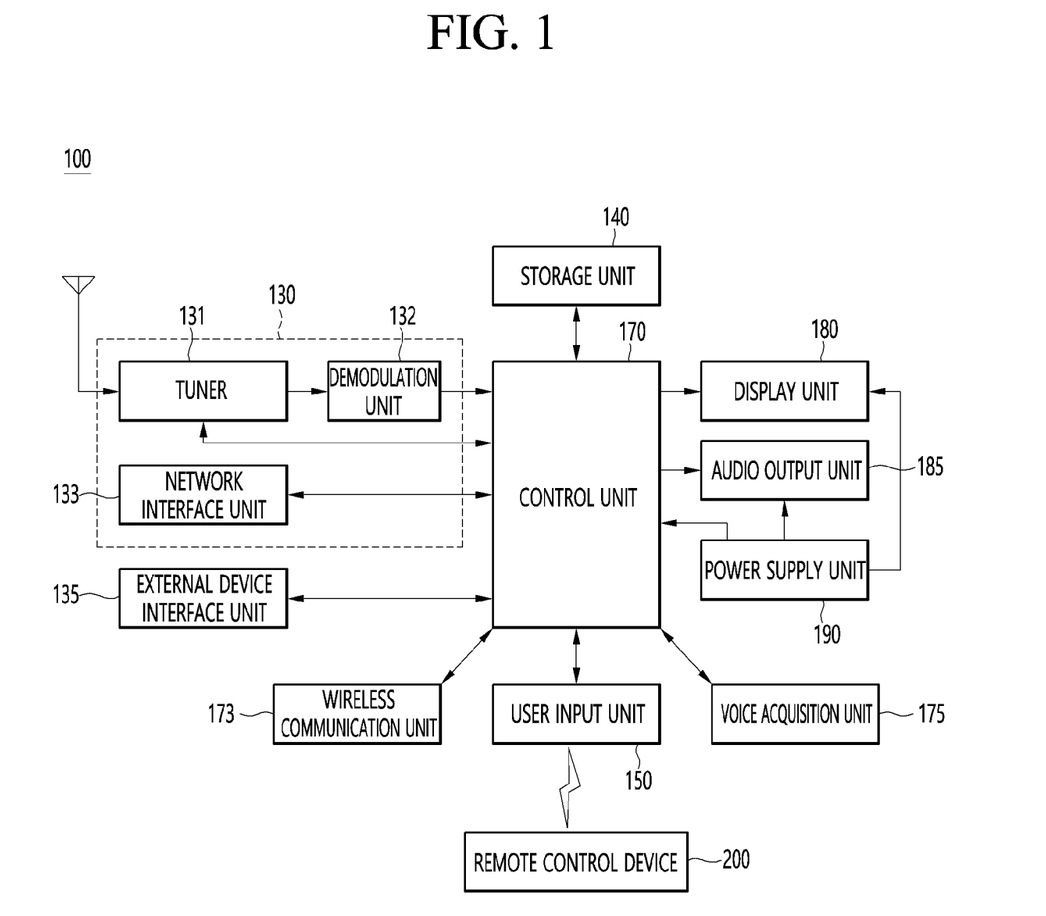
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 may include a broadcast reception module 130, an external device interface unit 135, a storage unit 140, a user input unit 150, a control unit 170, a wireless communication interface unit 173, a display unit 180, an audio output unit 185, and a power supply unit 190.

The broadcast reception module 130 may include a tuner 131, a demodulator 132, and a network interface 133.

The tuner 131 may select a specific broadcast channel according to a channel selection command. The tuner 131 may receive broadcast signals for the selected specific broadcast channel.

The demodulation unit 132 may divide the received broadcast signals into video signals, audio signals, and broadcast program-related data signals, and may restore the divided video signals, audio signals, and data signals into an output available form.

The network interface 133 may provide an interface for connecting the display device 100 to a wired/wireless network comprising internet network. The network interface 133 may transmit or receive data to or from another user or another electronic device through an accessed network or another network linked to the accessed network.

The network interface unit 133 may access a predetermined webpage through an accessed network or another network linked to the accessed network. That is, the network interface unit 133 may transmit or receive data to or from a corresponding server by accessing a predetermined webpage through the network.

The network interface unit 133 may receive content or data provided from a content provider or a network operator. That is, the network interface unit 133 may receive content, such as movies, advertisements, games, VODs, and broadcast signals, which are provided from the content provider or the network operator, and information relating thereto through the network.

In addition, the network interface unit 133 may receive firmware update information and update files provided from the network operator, and may transmit data to the Internet or content provider or the network operator.

The network interface 133 may select and receive a desired application among applications open to the air, through network.

The external device interface unit 135 may receive an application or an application list in an adjacent external device and deliver the application or the application list to the control unit 170 or the storage unit 140.

The external device interface unit 135 may provide a connection path between the display device 100 and an external device. The external device interface unit 135 may receive at least one of an image or audio outputted from an external device that is wirelessly or wiredly connected to the display device 100 and deliver the received image or the audio to the controller. The external device interface unit 135 may include a plurality of external input terminals. The plurality of external input terminals may include an RGB terminal, at least one High Definition Multimedia Interface (HDMI) terminal, and a component terminal.

An image signal of an external device inputted through the external device interface unit 135 may be outputted through the display unit 180. A sound signal of an external device inputted through the external device interface unit 135 may be outputted through the audio output unit 185.

An external device connectable to the external device interface unit 135 may be one of a set-top box, a Blu-ray player, a DVD player, a game console, a sound bar, a smartphone, a PC, a USB Memory, and a home theater system but this is just exemplary.

Additionally, some content data stored in the display device 100 may be transmitted to a user or an electronic device, which is selected from other users or other electronic devices pre-registered in the display device 100.

The storage unit 140 may store signal-processed image, voice, or data signals stored by a program in order for each signal processing and control in the control unit 170.

In addition, the storage unit 140 may perform a function for temporarily storing image, voice, or data signals output from the external device interface unit 135 or the network interface unit 133, and may store information on a predetermined image through a channel memory function.

The storage unit 140 may store an application or an application list input from the external device interface unit 135 or the network interface unit 133.

The display device 100 may play content files (e.g., video files, still image files, music files, document files, application files, etc.) stored in the storage unit 140, and may provide the content files to a user.

The user input unit 150 may transmit signals input by a user to the control unit 170, or may transmit signals from the control unit 170 to a user. For example, the user input unit 150 may receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR communication methods.

In addition, the user input unit 150 may transmit, to the control unit 170, control signals input from local keys (not shown) such as a power key, a channel key, a volume key, and a setting key.

Image signals that are image-processed by the control unit 170 may be input to the display unit 180 and displayed as images corresponding to the image signals. In addition, image signals that are image-processed by the control unit 170 may be input to an external output device through the external device interface unit 135.

Voice signals processed by the control unit 170 may be output to the audio output unit 185. In addition, voice signals processed by the control unit 170 may be input to the external output device through the external device interface unit 135.

Additionally, the control unit 170 may control overall operations of the display device 100.

In addition, the control unit 170 may control the display device 100 by a user command or an internal program input through the user input unit 150, and may access the network to download a desired application or application list into the display device 100.

The control unit 170 may output channel information selected by a user together with the processed image or voice signals through the display unit 180 or the audio output unit 185.

In addition, the control unit 170 may output image signals or voice signals of an external device such as a camera or a camcorder, which are input through the external device interface unit 135, through the display unit 180 or the audio output unit 185, according to an external device image playback command received through the user input unit 150.

Moreover, the control unit 170 may control the display unit 180 to display images, and may control the display unit 180 to display broadcast images input through the tuner 131, external input images input through the external device interface unit 135, images input through the network interface unit, or images stored in the storage unit 140. In this case, an image displayed on the display unit 180 may be a still image or video and also may be a 2D image or a 3D image.

Additionally, the control unit 170 may play content stored in the display device 100, received broadcast content, and external input content input from the outside, and the content may be in various formats such as broadcast images, external input images, audio files, still images, accessed web screens, and document files.

Moreover, the wireless communication unit 173 may perform wired or wireless communication with an external device. The wireless communication unit 173 may perform short-range communication with an external device. For this, the wireless communication unit 173 may support short-range communication by using at least one of Bluetooth™, Bluetooth Low Energy (BLE), Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 may support wireless communication between the display device 100 and a wireless communication system, between the display device 100 and another display device 100, or between networks including the display device 100 and another display device 100 (or an external server) through wireless area networks. The wireless area networks may be wireless personal area networks.

Herein, the other display device 100 may be a mobile terminal such as a wearable device (for example, a smart watch, a smart glass, and a head mounted display (HMD)) or a smartphone, which is capable of exchanging data (or inter-working) with the display device 100. The wireless communication unit 173 may detect (or recognize) a wearable device capable of communication around the display device 100. Furthermore, if the detected wearable device is a device authenticated to communicate with the display device 100, the control unit 170 may transmit at least part of data processed in the display device 100 to the wearable device through the wireless communication unit 173. Therefore, a user of the wearable device may use the data processed by the display device 100 through the wearable device.

The voice acquisition unit 175 may acquire audio. The voice acquisition unit 175 may include at least one microphone (not shown) and may acquire audio around the display device 100 through the microphone (not shown).

The display unit 180 may convert image signals, data signals, or on-screen display (OSD) signals, which are processed in the control unit 170, or images signals or data signals, which are received in the external device interface unit 135, into R, G, and B signals to generate driving signals.

Furthermore, the display device 100 shown in FIG. 1 is just one embodiment of the present disclosure and thus, some of the components shown may be integrated, added, or omitted according to the specification of the actually implemented display device 100.

That is, if necessary, two or more components may be integrated into one component, or one component may be divided into two or more components. Additionally, a function performed by each block is to describe an embodiment of the present disclosure and its specific operation or device does not limit the scope of the present disclosure.

According to another embodiment of the present disclosure, unlike FIG. 1, the display device 100 may receive images through the network interface unit 133 or the external device interface unit 135 and play them without including the tuner 131 and the demodulation unit 132.

For example, the display device 100 may be divided into an image processing device such as a set-top box for receiving broadcast signals or contents according to various network services and a content playback device for playing content input from the image processing device.

In this case, an operating method of a display device according to an embodiment of the present disclosure described below may be performed by one of the display device described with reference to FIG. 1, an image processing device such as the separated set-top box, and a content playback device including the display unit 180 and the audio output unit 185.

The audio output unit 185 receives the audio-processed signal from the control unit 170 to output an audio signal.

The power supply unit 190 supplies the corresponding power to the entire display device 100. Particularly, power may be supplied to the control unit 170 that is capable of being implemented in the form of a system on chip (SOC), the display unit 180 for displaying an image, the audio output unit 185 for outputting audio, and the like.

Specifically, the power supply unit 190 may include a converter that converts AC power to DC power and a DC/DC converter that converts a level of the DC power.

A remote control device according to an embodiment of the present disclosure will be described with reference to FIGS. 2 and 3.

Figure 2:
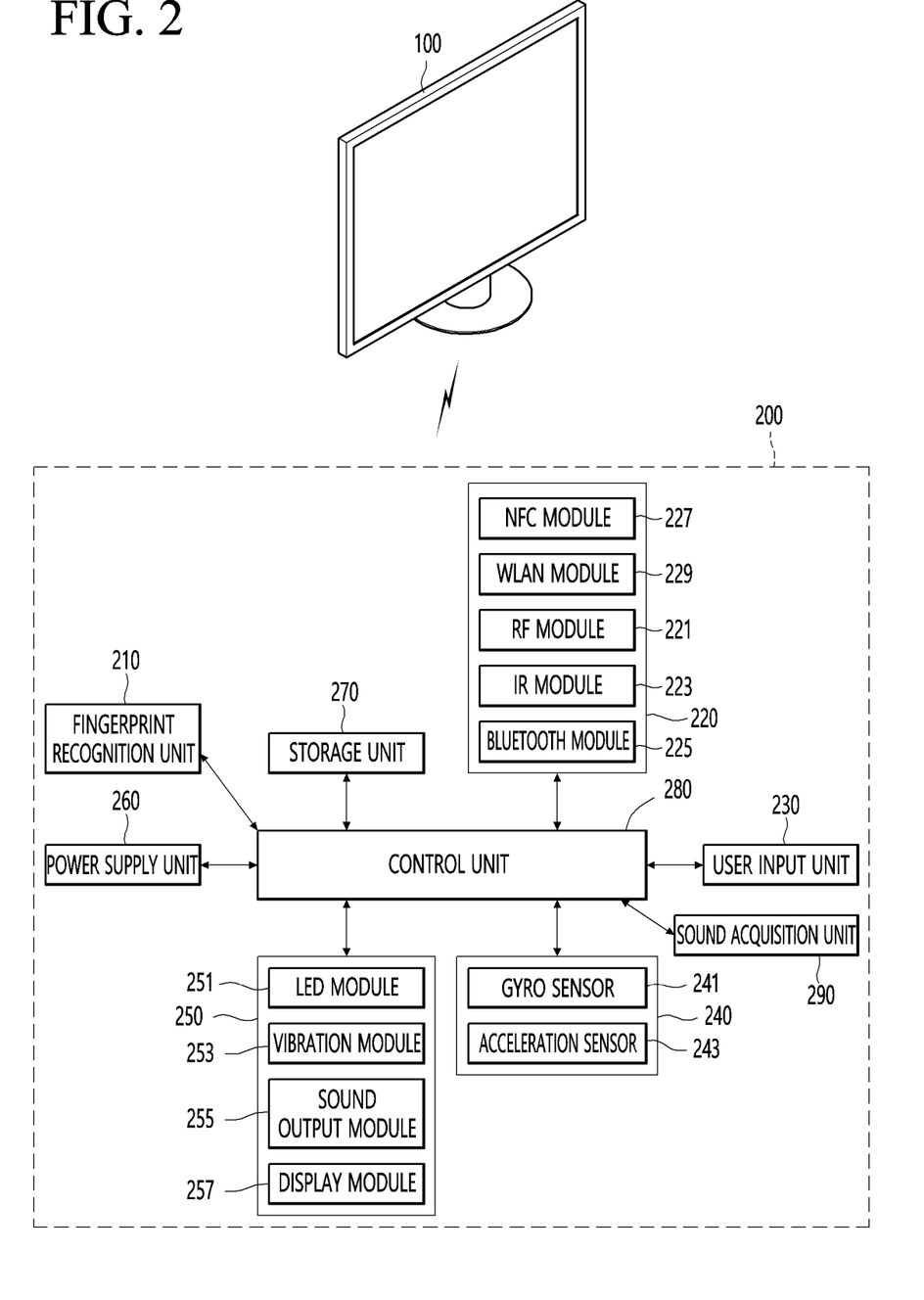
FIG. 2 is a block diagram illustrating a remote control device according to an embodiment of the present disclosure.
Figure 3:
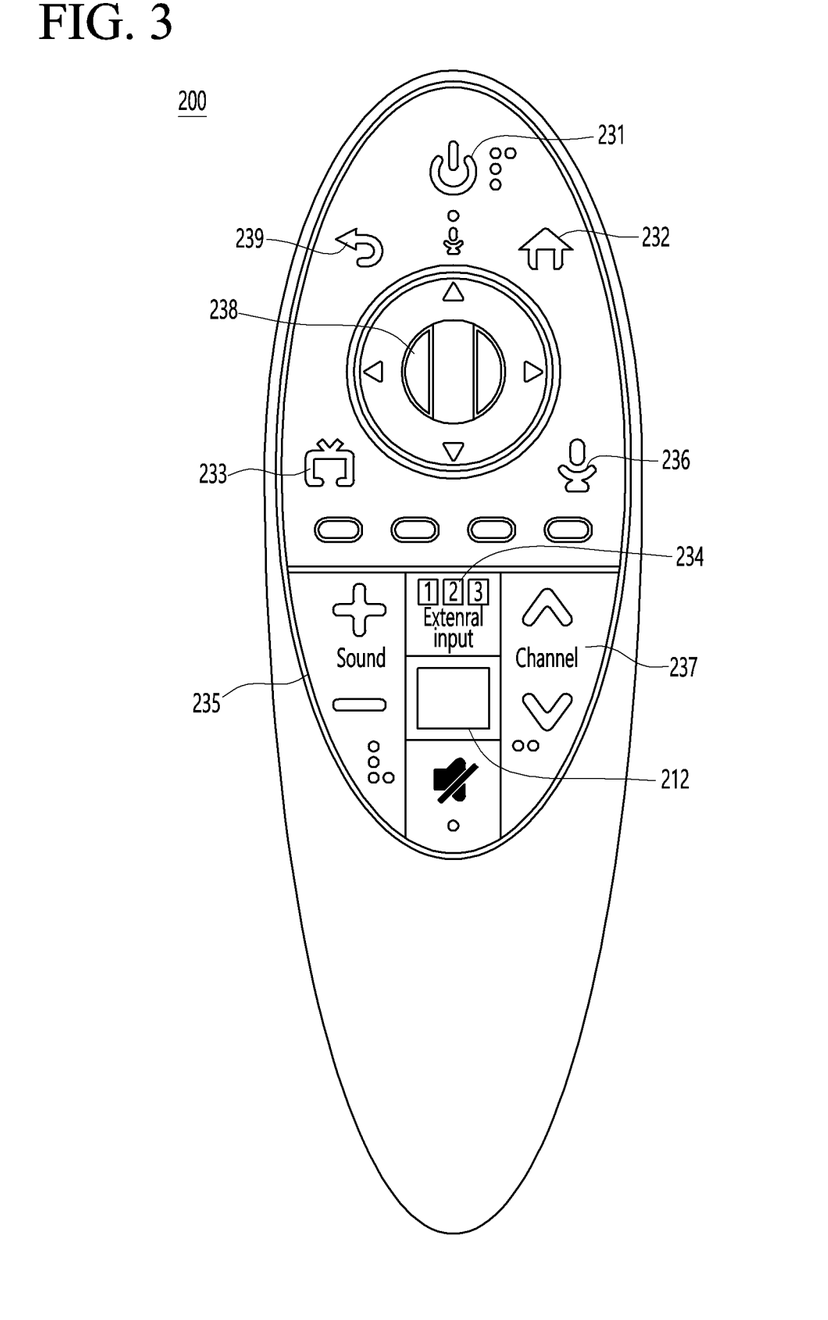
FIG. 3 is a view illustrating an actual configuration of a remote control device according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 may include a fingerprint recognition unit 210, a wireless communication unit 220, a user input unit 230, a sensor unit 240, an output unit 250, a power supply unit 260, a storage unit 270, a control unit 280, and a sound acquisition unit 290.

Referring to FIG. 2, the wireless communication unit 220 transmits/receives signals to/from an arbitrary any one of display devices according to the above-mentioned embodiments of the present disclosure.

The remote control device 200 may include a radio frequency (RF) module 221 capable of transmitting or receiving signals to or from the display device 100 according to an RF communication standard, and an IR module 223 capable of transmitting or receiving signals to or from the display device 100 according to an IR communication standard. In addition, the remote control device 200 may include a Bluetooth module 225 capable of transmitting or receiving signals to or from the display device 100 according to a Bluetooth communication standard. In addition, the remote control device 200 may include an NFC module 227 capable of transmitting or receiving signals to or from the display device 100 according to an NFC communication standard, and a wireless LAN (WLAN) module 229 capable of transmitting or receiving signals to or from the display device 100 according to a WLAN communication standard.

In addition, the remote control device 200 may transmit signals containing information on the movement of the remote control device 200 to the display device 100 through the wireless communication unit 220.

Moreover, the remote control device 200 may receive signals transmitted from the display device 100 through the RF module 221 and if necessary, may transmit a command for power on/off, channel change, and volume change to the display device 100 through the IR module 223.

The user input unit 230 may be configured with a keypad, a button, a touch pad, or a touch screen. A user may operate the user input unit 230 to input a command relating to the display device 100 to the remote control device 200. If the user input unit 230 includes a hard key button, a user may input a command relating to the display device 100 to the remote control device 200 through the push operation of the hard key button. This will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back button 239.

The fingerprint recognition button 212 may be a button for recognizing a user's fingerprint. According to an embodiment of the present disclosure, the fingerprint recognition button 212 may perform a push operation and receive a push operation and a fingerprint recognition operation. The power button 231 may be a button for turning on/off the power of the display device 100. The home button 232 may be a button for moving to the home screen of the display device 100. The live button 233 may be a button for displaying live broadcast programs. The external input button 234 may be a button for receiving an external input connected to the display device 100. The volume control button 235 may be a button for controlling a volume output from the display device 100. The voice recognition button 236 may be a button for receiving user's voice and recognizing the received voice. The channel change button 237 may be a button for receiving broadcast signals of a specific broadcast channel. The OK button 238 may be a button for selecting a specific function, and the back button 239 may be a button for returning to a previous screen.

FIG. 2 is described again.

If the user input unit 230 includes a touch screen, a user may touch a soft key of the touch screen to input a command relating to the display device 100 to the remote control device 200. In addition, the user input unit 230 may include various kinds of input interfaces operable by a user, for example, a scroll key and a jog key, and this embodiment does not limit the scope of the present disclosure.

The sensor unit 240 may include a gyro sensor 241 or an acceleration sensor 243. The gyro sensor 241 may sense information on the movement of the remote control device 200.

For example, the gyro sensor 241 may sense information on an operation of the remote control device 200 on the basis of x, y, and z axes and the acceleration sensor 243 may sense information on a movement speed of the remote control device 200. Moreover, the remote control device 200 may further include a distance measurement sensor that senses a distance with respect to the display unit 180 of the display device 100.

The output unit 250 may output image or voice signals in response to the operation of the user input unit 230, or may output image or voice signals corresponding to signals transmitted from the display device 100. A user may recognize whether the user input unit 230 is operated or the display device 100 is controlled through the output unit 250.

For example, the output unit 250 may include an LED module 251 for flashing, a vibration module 253 for generating vibration, a sound output module 255 for outputting sound, or a display module 257 for outputting an image, if the user input unit 230 is manipulated or signals are transmitted/received to/from the display device 100 through the wireless communication unit 220.

Additionally, the power supply unit 260 supplies power to the remote control device 200 and if the remote control device 200 does not move for a predetermined time, stops the power supply, so that power waste may be reduced. The power supply unit 260 may resume the supply of power if a predetermined key provided at the remote control device 200 is operated.

The storage unit 270 may store various kinds of programs and application data required to control or operate the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 may store, in the storage unit 270, information on a frequency band for transmitting/receiving signals to/from the display device 100 paired with the remote control device 200 and refer to it.

The control unit 280 controls general matters relating to the control of the remote control device 200. The control unit 280 may transmit a signal corresponding to a predetermined key operation of the user input unit 230 or a signal corresponding to the movement of the remote control device 200 sensed by the sensor unit 240 to the display device 100 through the wireless communication unit 220.

In addition, the sound acquisition unit 290 of the remote control device 200 may acquire voice.

The sound acquisition unit 290 may include at least one microphone and acquire voice through the microphone.

Figure 4:
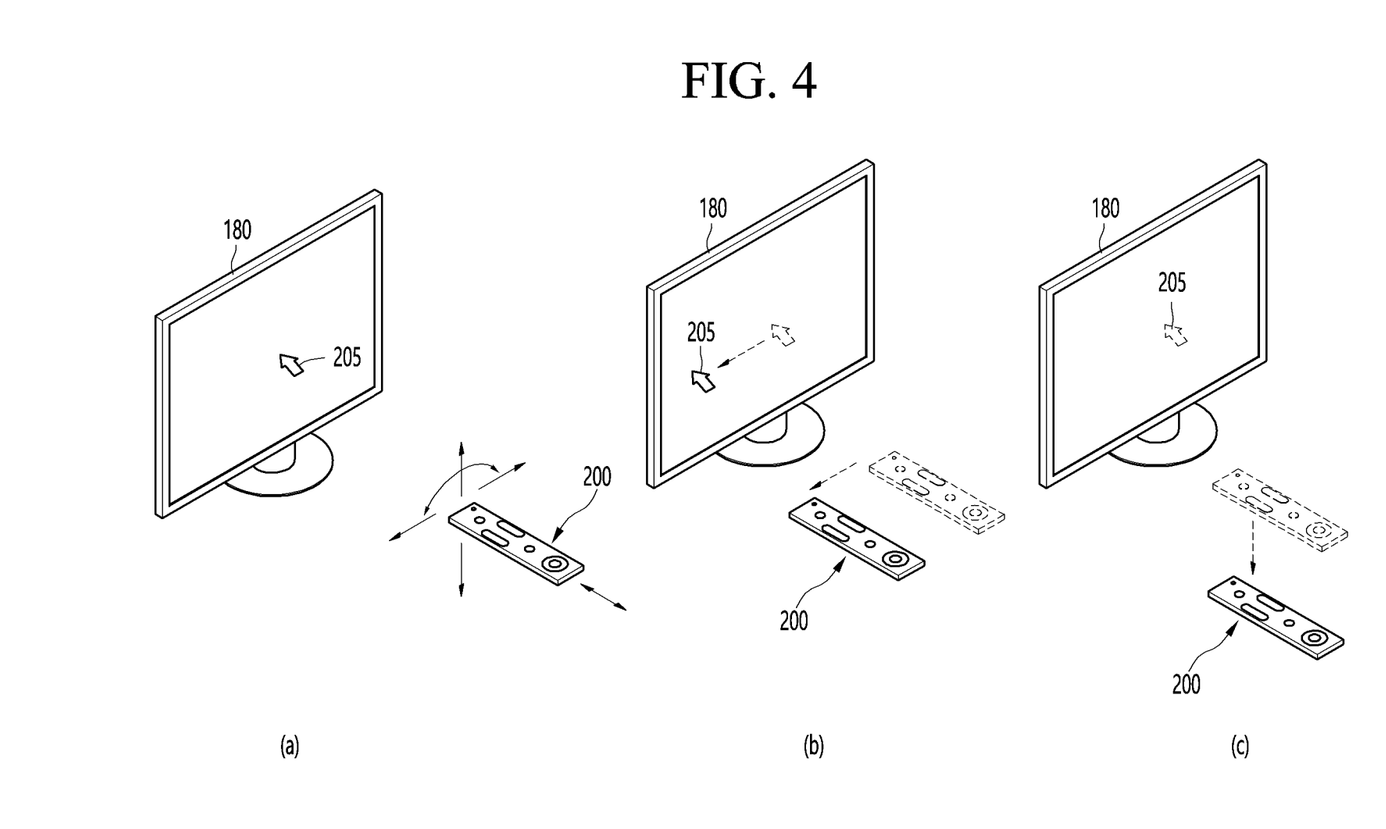
FIG. 4 is a view illustrating an example of utilizing a remote control device according to an embodiment of the present disclosure.

Next, FIG. 4 is described.

FIG. 4 is a view illustrating an example of utilizing a remote control device according to an embodiment of the present disclosure.

FIG. 4(*a*) illustrates that a pointer 205 corresponding to the remote control device 200 is displayed on the display unit 180.

A user may move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 may be referred to as a spatial remote control device.

FIG. 4(*b*) illustrates that if a user moves the remote control device 200, the pointer 205 displayed on the display unit 180 of the display device 100 is moved to the left according to the movement of the remote control device 200.

Information on a movement of the remote control device 200 detected through a sensor of the remote control device 200 is transmitted to the display device 100. The display device 100 may calculate the coordinates of the pointer 205 from the information on the movement of the remote control device 200. The display device 100 may display the pointer 205 to match the calculated coordinates.

FIG. 4(*c*) illustrates that while a specific button in the remote control device 200 is pressed, a user moves the remote control device 200 away from the display unit 180. Thus, a selected region in the display unit 180 corresponding to the pointer 205 may be zoomed in and displayed in an enlarged size.

On the other hand, if a user moves the remote control device 200 close to the display unit 180, a selection area in the display unit 180 corresponding to the pointer 205 may be zoomed out and displayed in a reduced size.

On the other hand, if the remote control device 200 is moved away from the display unit 180, a selection area may be zoomed out and if the remote control device 200 is moved closer to the display unit 180, a selection area may be zoomed in.

Additionally, if a specific button in the remote control device 200 is pressed, recognition of a vertical or horizontal movement may be excluded. That is, if the remote control device 200 is moved away from or closer to the display unit 180, the up, down, left, or right movement cannot be recognized and only the back and forth movement may be recognized. While a specific button in the remote control device 200 is not pressed, only the pointer 205 is moved according to the up, down, left or right movement of the remote control device 200.

Moreover, the moving speed or moving direction of the pointer 205 may correspond to the moving speed or moving direction of the remote control device 200.

Furthermore, a pointer in this specification means an object displayed on the display unit 180 in response to an operation of the remote control device 200. Therefore, in addition to the arrow form displayed as the pointer 205 in the drawing, various forms of objects are possible. For example, the above concept includes a point, a cursor, a prompt, and a thick outline. Then, the pointer 205 may be displayed in correspondence to one point of a horizontal axis and a vertical axis on the display unit 180 and also may be displayed in correspondence to a plurality of points such as a line and a surface.

The power supply unit 190 may be provided with a DC/DC converter, which is capable of converting a level of DC power and output the converted DC power to the load. The DC/DC converter may convert a size of DC power according to the load.

Figure 5:
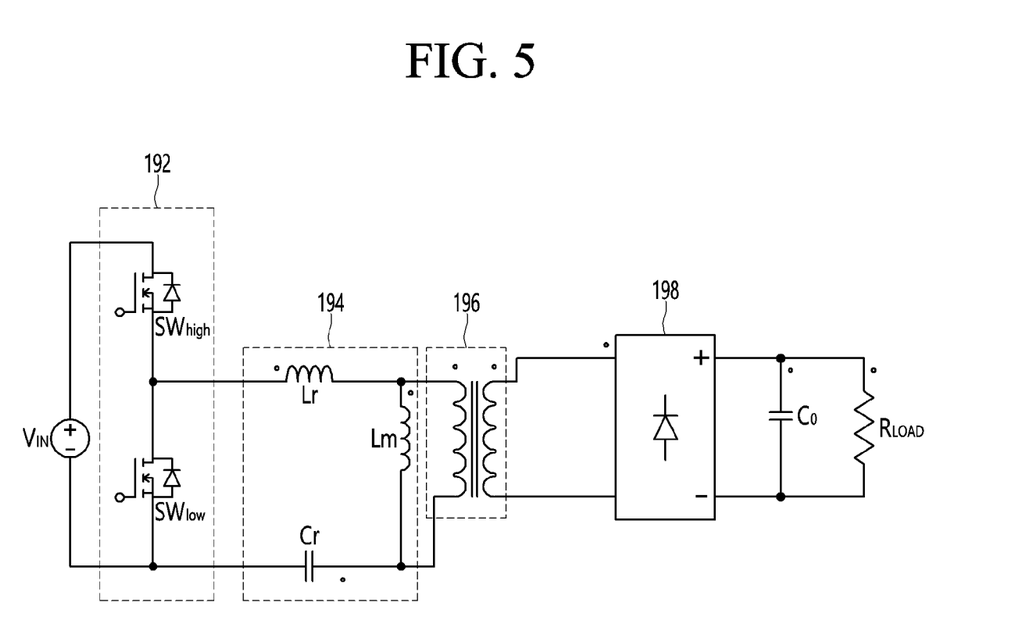
FIG. 5 is a circuit diagram of an LLC resonance converter.

The DC/DC converter may be an LLC resonance converter as illustrated in FIG. 5.

FIG. 5 is a circuit diagram of the LLC resonance converter.

The LLC resonance converter may include at least some or all of a half bridge circuit 192, an LLC resonance circuit 194, an isolation transformer 196, and a rectifier 198. The LLC resonance converter in FIG. 5 may be merely an example for convenience of explanation, and its structure or configuration may vary according to an embodiment.

The half bridge circuit 192 may include two switching elements, that is, a high-side switching element and a low-side switching element. The two switching elements may convert an input DC voltage to an AC voltage. The half bridge circuit 192 may be a square wave oscillator.

The half bridge circuit 192 may be connected to the LLC resonance circuit 194.

The LLC resonance circuit 194 may be a resonance network circuit. The LLC resonance circuit 194 may be constituted by a resonance inductance Lr, a resonance capacitance Cr, and a transformer magnetizing inductance $L_m$. The LLC resonance circuit 194 may achieve zero voltage switching ZVS by generating a resonance phenomenon.

The transformer 196 may transform the AC voltage converted in the half bridge circuit 192 by a turns ratio. The transformer 196 may insulate a primary side and a secondary side.

The rectifier 198 may rectify a secondary-side voltage transformed through the transformer 196 into a DC voltage to transmit the rectified voltage to the load. The rectifier 198 may be provided as at least one diode.

In order to achieve high efficiency, the LLC resonance converter may set an operating point at a point at which a switching frequency is greater than a resonance frequency. In addition, the LLC resonance converter may adjust the gain through the frequency control. That is, the control unit 170 may adjust the gain by controlling the operating frequency of the LLC resonance converter.

Figure 6:
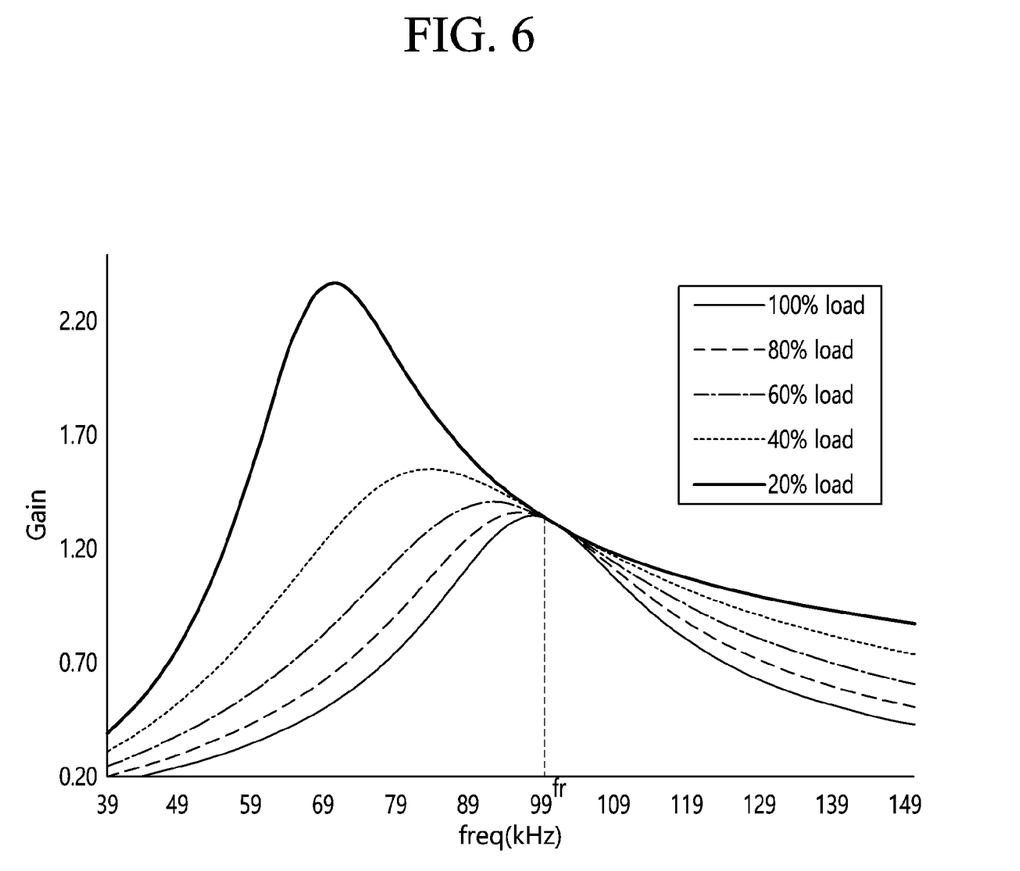
FIG. 6 is a curve illustrating a gain according to a change in frequency and load of the LLC resonance converter.

FIG. 6 is a curve illustrating the gain according to a change in frequency and load of the LLC resonance converter.

Referring to FIG. 6, in a frequency band greater than the resonance frequency $f_r$, the gain may be easily adjusted because the gain change is large as the load is large. However, as the load is small, the gain change may be small, and thus, it may be difficult to adjust the gain. That is, the LLC resonance converter may adjust the gain through the frequency control at a heavy load, but it may be difficult to adjust the gain through the frequency control at the light load. Thus, in the existing LLC resonance converter, the switching frequency is excessively large to adjust the gain at the light load, and the efficiency is reduced.

Thus, in the present disclosure, an increase in switching frequency may be minimized by changing the resonance frequency at the light load. That is, in the present disclosure, the resonance frequency may be changed according to the load because one LLC resonance converter has two resonance frequencies.

For this, the LLC resonance converter according to an embodiment of the present disclosure may further include components for detecting the load and changing the resonance frequency according to the detected load.

Figure 7:
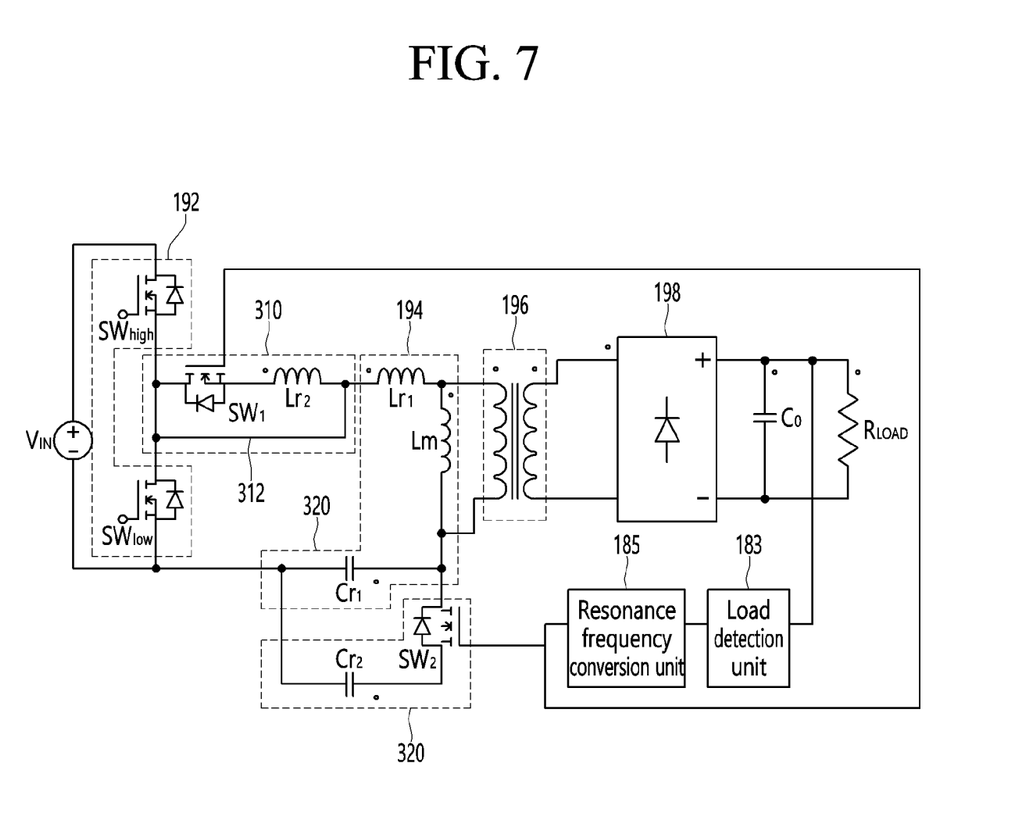
FIG. 7 is a circuit diagram of an LLC resonance converter according to an embodiment of the present disclosure.

FIG. 7 is a circuit diagram of the LLC resonance converter according to an embodiment of the present disclosure.

The LLC resonance converter according to an embodiment of the present disclosure may include a half bridge circuit 192, an LLC resonance circuit 194, an isolation transformer 196, a rectifier 198, and resonance frequency conversion modules 310 and 320.

A load detection unit 183 and a resonance frequency converter 185 may be components of the LLC resonance converter or components of the control unit 170 of FIG. 1.

When compared to FIG. 5, the LLC resonance converter according to an embodiment of the present disclosure may further include the resonance frequency conversion modules 310 and 320. In addition, the display device 100 may further include a load detection unit 183 and a resonance frequency converter 185.

Since the half bridge circuit 192, the LLC resonance circuit 194, the isolation transformer 196, and the rectifier 198 are the same or similar to those described in FIG. 5, overlapping descriptions will be omitted.

The load detection unit 183 may be connected to a load $R_{LOAD}$ to detect the load. The load detection unit 183 may detect the load to acquire load information.

The load information may include power consumption of the display device 100.

The load detection unit 183 may acquire the power consumption of the display device 100.

According to an embodiment, the load information may further include information about an operating state of the display device 100. For example, the load information may include a screen mode, set brightness, etc.

Thus, the load detection unit 183 may acquire the load information including at least one of the power consumption, the screen mode, or the set brightness of the display device 100.

The resonance frequency converter 185 may determine whether to change the resonance frequency according to the load information, and the resonance frequency conversion modules 310 and 320 may change the resonance frequency.

The resonance frequency converter 185 may be implemented using combination of a traditional analog photo coupler/OP AMP circuit or a digital control of an LLC Controller.

The resonance frequency conversion modules 310 and 320 may include a sub-resonance inductance 310 and a sub-resonance capacitance 320.

The resonance frequency converter 185 may determine the resonance frequency based on the load information acquired by the load detection unit 183. The resonance frequency converter 185 may determine whether to change the resonance frequency according to the load information. For example, the resonance frequency converter 185 may determine the resonance frequency as the first resonance frequency or the second resonance frequency based on the load information. The resonance frequency converter 185 may determine whether to maintain the current resonance frequency or change to another resonance frequency, based on the load information. Based on the load information, the resonance frequency converter 185 may determine the resonance frequency as the first resonance frequency when the current load is determined as the heavy load and may determine the resonance frequency to a second resonance frequency less than the first resonance frequency when the current load is determined as the light load.

The resonance frequency converter 185 may control the sub-resonance inductance 310 and sub-resonance capacitance 320 based on the determined resonance frequency.

The sub-resonance inductance 310 may be selectively connected to the LLC resonance circuit 194. The sub-resonance inductance 310 may or may not be connected to the LLC resonance circuit 194 according to the determined resonance frequency. The sub-resonance inductance 310 may or may not be connected to the LLC resonance circuit 194 according to the current load.

For example, the sub-resonance inductance 310 may not be connected to the LLC resonance circuit 194 when the resonance frequency is determined as the first resonance frequency and may be connected to the LLC resonance circuit 194 when the resonance frequency is determined as the second resonance frequency less than the first resonance frequency. The sub-resonance inductance 310 may not be connected to the LLC resonance circuit 194 when the current load is the heavy load and may be connected to the LLC resonance circuit 194 when the current load is the light load.

The LLC resonance circuit 194 may be constituted by a first resonance inductance $L_{r1}$, a first resonance capacitance $C_{r1}$, and a transformer magnetizing inductance $L_m$.

The sub-resonance inductance 310 may include a first switch $SW_1$ and a second resonance inductance $L_{r2}$. The resonance frequency converter 185 may control the sub-resonance inductance 310. The first switch $SW_1$ may be turned on/off by control of the resonance frequency converter 185. The resonance frequency converter 185 may determine whether to connect the sub-resonance inductance 310 to the LLC resonance circuit 194 by turning the first switch $SW_1$ on/off.

When the first switch $SW_1$ is turned on, the second resonance inductance $L_{r2}$ may be connected to the LLC resonance circuit 194. In detail, when the first switch $SW_1$ is turned on, the first resonance inductance $L_{r1}$ and the second resonance inductance $L_{r2}$ may be connected to each other. When the first switch $SW_1$ is turned on, the first resonance inductance $L_{r1}$ may be connected in series to the second resonance inductance $L_{r2}$.

The first switch $SW_1$ may have one end connected between the two switching elements of the half bridge circuit 192 and the other end connected to the second resonance inductance $L_{r2}$. The second resonance inductance $L_{r2}$ may have one end connected to the first switch $SW_1$ and the other end connected to the first resonance inductance $L_{r1}$. The positions of the first switch $SW_1$ and the second resonance inductance $L_{r2}$ may be mutually changed. The first switch $SW_1$ may receive a control signal from the resonance frequency converter 185.

The sub-resonance capacitance 320 may also be similar to the sub-resonance inductance 310.

The sub-resonance capacitance 320 may be selectively connected to the LLC resonance circuit 194. The sub-resonance capacitance 320 may or may not be connected to the LLC resonance circuit 194 according to the determined resonance frequency. The sub-resonance capacitance 320 may or may not be connected to the LLC resonance circuit 194 according to the current load.

For example, the sub-resonance capacitance 320 may not be connected to the LLC resonance circuit 194 when the resonance frequency is determined as the first resonance frequency and may be connected to the LLC resonance circuit 194 when the resonance frequency is determined as the second resonance frequency less than the first resonance frequency. The sub-resonance capacitance 320 may not be connected to the LLC resonance circuit 194 when the current load is the heavy load and may be connected to the LLC resonance circuit 194 when the current load is the light load.

The LLC resonance circuit 194 may be constituted by a first resonance inductance $L_{r1}$, a first resonance capacitance $C_{r1}$, and a transformer magnetizing inductance $L_m$.

The sub-resonance capacitance 320 may include a second switch $SW_2$ and a second resonance capacitance $C_{r2}$. The resonance frequency converter 185 may control the sub-resonance capacitance 320. The second switch $SW_2$ may be turned on/off by control of the resonance frequency converter 185. The resonance frequency converter 185 may determine whether to connect the sub-resonance capacitance 320 to the LLC resonance circuit 194 by turning the second switch $SW_2$ on/off.

When the second switch $SW_2$ is turned on, the second resonance capacitance $C_{r2}$ may be connected to the LLC resonance circuit 194. In detail, when the second switch $SW_2$ is turned on, the first resonance capacitance $C_{r1}$ and the second resonance capacitance $C_{r2}$ may be connected to each other. When the second switch $SW_2$ is turned on, the first resonance capacitance $C_{r1}$ may be connected in parallel to the second resonance capacitance $C_{r2}$.

The second switch $SW_2$ may have one end connected to the LLC resonance circuit 194 and the other end connected to the second resonance capacitance $C_{r2}$. The second resonance capacitance $C_{r2}$ may have one end connected to the second switch $SW_2$ and the other end connected to the LLC resonance circuit 194. The positions of the second switch $SW_2$ and the second resonance capacitance $C_{r2}$ may be mutually changed. The second switch $SW_2$ may receive a control signal from the resonance frequency converter 185.

When the first switch $SW_1$ and the second switch $SW_2$ are turned off, the first resonance inductance $L_{r1}$ and the first resonance capacitance $C_{r1}$ may form a resonance circuit, and the resonance frequency may be a first resonance frequency.

In addition, when the first switch $SW_1$ and the second switch $SW_2$ are turned on, the first and second resonance inductances $L_{r1}$ and $L_{r2}$ and the first and second resonance capacitances $C_{r1}$ and $C_{r2}$ may form a resonance circuit, and the resonance frequency may be a second resonance frequency that is less than the first resonance frequency.

As described above, the LLC resonance converter according to an embodiment of the present disclosure may adjust the resonance frequency to the first resonance frequency or the second resonance frequency that is less than the first resonance frequency according to the load information. In addition, when the resonance frequency is changed, a gain change according to the frequency and load changes, and thus, a gain curve according to the resonance frequency will be described with reference to FIG. 8.

Figure 8:
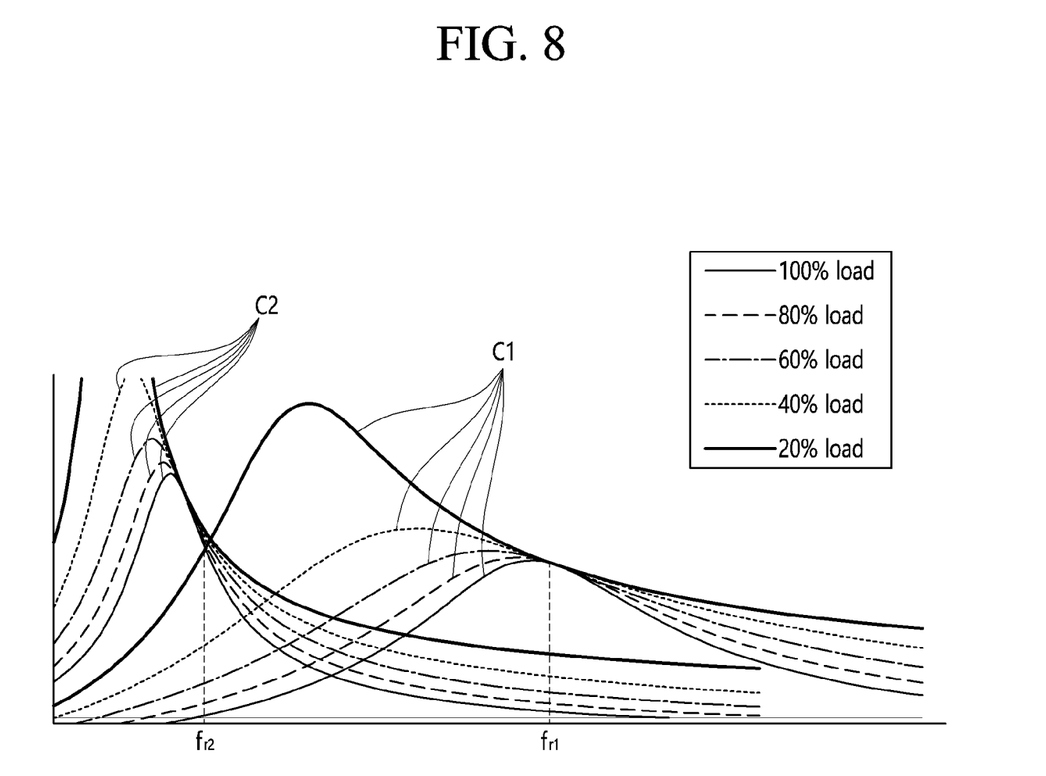
FIG. 8 is a curve illustrating a gain according to a change in frequency and load of the LLC resonance converter according to an embodiment of the present disclosure.

FIG. 8 is a curve illustrating a gain according to a change in frequency and load of the LLC resonance converter according to an embodiment of the present disclosure.

Like FIG. 6, a horizontal axis in FIG. 8 represents a frequency, and a vertical axis represents a gain.

A plurality of first curves C1 illustrated in FIG. 8 are curves illustrating a gain for each load when the resonance frequency is a first resonance frequency $f_{r1}$, and a plurality of second curves C2 are curves illustrating a gain for each load when the resonance frequency is a second resonance frequency $f_{r2}$ that is less than the first resonance frequency $f_{r1}$.

Referring to the curve of a light load, especially 20% load, it is seen that a gain change according to the frequency change in a frequency band greater than the first resonance frequency $f_{r1}$ is less than a gain change according to the frequency change in a frequency band greater than the second resonance frequency $f_{r2}$. That is, it is seen that the gain change according to the frequency change is large when the resonance frequency is the second resonance frequency $f_{r2}$ compared to when the resonance frequency is the first resonance frequency $f_{r1}$.

Thus, when operating at the first resonance frequency $f_{r1}$, a problem of deteriorating efficiency due to the small gain change at the light load may be improved by changing the resonance frequency to the second resonance frequency $f_{r2}$.

Figure 9:
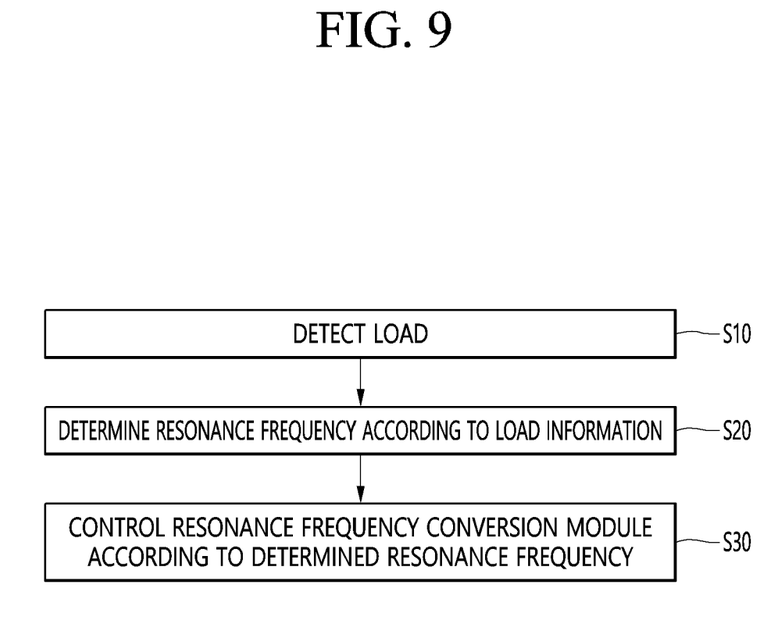
FIG. 9 is a flowchart illustrating a method for operating a display device according to an embodiment of the present disclosure.

FIG. 9 is a flowchart illustrating a method for operating a display device according to an embodiment of the present disclosure.

A display device 100 according to an embodiment of the present disclosure may include an LLC resonance converter as illustrated in FIG. 7 as a DC/DC converter.

A load detection unit 183 may detect a load (S10).

The load detection unit 183 may detect the load to acquire load information.

The resonance frequency converter 185 may determine the resonance frequency according to the load information acquired by the load detection unit 183 (S20).

The resonance frequency conversion unit 185 may control resonance frequency conversion modules 310 and 320 according to the determined resonance frequency (S30).

Next, the method for operating the above-described display device 100 will be described through specific examples. In addition, since the load detection unit 183 and the resonance frequency conversion unit 185 are components of a control unit 170, the load detection unit 183 and the resonance frequency conversion unit 185 will be described as being performed by the control unit 170. In addition, hereinafter, a 'heavy load' may be intended to be distinguished from a 'light load', and the 'heavy load' may mean at least one load state excluding the light load. For example, if the light load is less than 20% load, the heavy load may mean 40% load to 60% load, or the heavy load may mean 40% load to 100% load. That is, since the 'heavy load' and the 'light load' are merely for convenience of explanation, it is reasonable not to be limited to these names.

Describing the first example, the control unit 170 may acquire power consumption of the display device 100 using load information. The control unit 170 may preset reference power for determining whether the current load is the light load or the heavy load.

When the control unit 170 acquires the power consumption of the display device 100, it may compare the power consumption with the reference power. The control unit 170 may determine the power consumption as the heavy load if the power consumption is greater than the reference power and may determine the power consumption as the light load if the power consumption is less than the reference power.

The controller 170 may control the resonance frequency conversion modules 310 and 320 so that the resonance frequency becomes the first resonance frequency when the load is the heavy load, and the resonance frequency becomes the second resonance frequency when the load is the light load.

Next, describing the second example, the control unit 170 may acquire a screen mode using the load information. The control unit 170 may preset whether each screen mode is the heavy load or light load. For example, the control unit 170 may store data mapping the load state for each screen mode, such as the heavy load when the screen mode is a clear mode or standard mode, and the light load when the screen mode is a power saving mode.

When the control unit 170 acquires the screen mode using the load information, the load state that is mapped to the screen mode may be acquired to determine whether it is the heavy load or the light load. The control unit 170 may determine the screen mode as the heavy load if the screen mode is the clear mode or standard mode and may determine the screen mode as the light load if the screen mode is the power saving mode.

The controller 170 may control the resonance frequency conversion modules 310 and 320 so that the resonance frequency becomes the first resonance frequency when the load is the heavy load, and the resonance frequency becomes the second resonance frequency when the load is the light load.

Next, describing the third example, the control unit 170 may acquire set brightness using the load information. The control unit 170 may preset reference brightness for determining whether the current load is the light load or the heavy load.

When the control unit 170 acquires the set brightness of the display device 100, it may compare the set brightness with the reference brightness. The control unit 170 may determine the set brightness as the heavy load if the set brightness is brighter than the standard brightness and may determine the set brightness as the light load if the set brightness is darker than the reference brightness.

The controller 170 may control the resonance frequency conversion modules 310 and 320 so that the resonance frequency becomes the first resonance frequency when the load is the heavy load, and the resonance frequency becomes the second resonance frequency when the load is the light load.

As described above, the display device 100 according to the present disclosure may adjust the resonance frequency according to the load information, that is, the current load state. Therefore, there may be the advantage in that the gain adjustment is facilitated by adjusting the resonance frequency to be low at the light load, thereby minimizing the efficiency deterioration.

The above-described present disclosure may be implemented as a computer-readable code on a computer-readable medium in which a program is stored. The computer readable recording medium includes all types of recording devices in which data readable by a computer system is stored. Examples of the computer-readable recording medium include hard disk drives (HDD), solid state disks (SSD), silicon disk drives (SDD), read only memories (ROMs), random access memories (RAMs), compact disc read only memories (CD-ROMs), magnetic tapes, floppy discs, and optical data storage devices. In addition, the computer may include the control unit 170 of the display device 100. Thus, the detailed description is intended to be illustrative, but not limiting in all aspects. It is intended that the scope of the present invention should be determined by the rational interpretation of the claims as set forth, and the modifications and variations of the present invention come within the scope of the appended claims and their equivalents.

The above-disclosed subject matter is to be considered illustrative, and not restrictive, and the appended claims are intended to cover all such modifications, enhancements, and other embodiments, which fall within the true spirit and scope of the present invention.

Thus, the embodiment of the present invention is to be considered illustrative, and not restrictive, and the technical spirit of the present invention is not limited to the foregoing embodiment.

Therefore, the scope of the present invention is defined not by the detailed description of the invention but by the appended claims, and all differences within the scope will be construed as being comprised in the present invention.

The invention claimed is:

1. A display device comprising:
   a display;
   a power supply unit comprising a DC/DC converter configured to convert a level of DC power so as to supply the converted DC power to a load; and
   a control circuit configured to:
   control an operating frequency of the DC/DC converter;
   change a resonance frequency of the DC/DC converter according to the load;
   acquire set brightness of the display on a basis of information about the load; and
   change the resonance frequency according to the set brightness.

2. The display device according to claim 1, wherein the control circuit is configured to:
   acquire power consumption of the display device on the basis of information about the load; and
   change the resonance frequency according to the power consumption.

3. The display device according to claim 1, wherein the control circuit is configured to:
   acquire a screen mode of the display on the basis of information about the load; and
   change the resonance frequency according to the screen mode.

4. The display device according to claim 1, wherein the control circuit is configured to:
   change the resonance frequency to a first resonance frequency when the load is a heavy load; and
   change the resonance frequency to a second resonance frequency less than the first resonance frequency when the load is a light load.

5. The display device according to claim 1, wherein the DC/DC converter comprises:
   a half bridge circuit;
   an LLC resonance circuit comprising a first resonance inductance and a first resonance capacitance; and
   a rectifier.

6. The display device according to claim 5, wherein the DC/DC converter further comprises a sub-resonance inductance and a sub-resonance capacitance, which are selectively connected to the LLC resonance circuit.

7. The display device according to claim 6, wherein the sub-resonance inductance comprises a first switch and a second resonance inductance, and
   the sub-resonance capacitance comprises a second switch and a second resonance capacitance.

8. The display device according to claim 7, wherein, when the first switch is turned on, the first resonance inductance and the second resonance inductance are connected to each other, and
   when the second switch is turned on, the first resonance capacitance and the second resonance capacitance are connected to each other.

9. The display device according to claim 8, wherein the first resonance inductance and the second resonance inductance are connected in series, and the first resonance capacitance and the second resonance capacitance are connected in parallel.

* * * * *